United States Patent
Chen Kaidi

(10) Patent No.: US 11,822,697 B2
(45) Date of Patent: Nov. 21, 2023

(54) DYNAMIC PIXEL DISPLAY IN ELECTRONIC COMMUNICATIONS TO ENHANCE DATA SECURITY

(71) Applicant: PAYPAL, INC., San Jose, CA (US)

(72) Inventor: George Chen Kaidi, Singapore (SG)

(73) Assignee: PAYPAL, INC., San Jose, CA (US)

( * ) Notice: Subject to any disclaimer, the term of this patent is extended or adjusted under 35 U.S.C. 154(b) by 336 days.

(21) Appl. No.: 16/995,659

(22) Filed: Aug. 17, 2020

(65) Prior Publication Data

US 2022/0050923 A1   Feb. 17, 2022

(51) Int. Cl.
*G06F 21/62* (2013.01)
*G06F 21/44* (2013.01)
*G06F 16/955* (2019.01)

(52) U.S. Cl.
CPC ......... *G06F 21/6263* (2013.01); *G06F 21/44* (2013.01); *G06F 16/9558* (2019.01)

(58) Field of Classification Search
CPC ... G06F 21/6263; G06F 21/44; G06F 16/9558
See application file for complete search history.

(56) References Cited

U.S. PATENT DOCUMENTS

| | | | | |
|---|---|---|---|---|
| 8,739,278 | B2 * | 5/2014 | Varghese | G06F 21/6263 726/22 |
| 10,542,018 | B1 * | 1/2020 | Anderson | H04L 63/083 |
| 2008/0120378 | A2 | 5/2008 | Smith | |
| 2011/0093527 | A1 | 4/2011 | Doyle | |
| 2015/0193390 | A1 * | 7/2015 | Stekkelpak | G06F 16/9558 715/207 |
| 2018/0006011 | A1 * | 1/2018 | Ninan | G02F 1/13336 |
| 2018/0212931 | A1 * | 7/2018 | Zhou | H04L 63/12 |
| 2020/0042837 | A1 * | 2/2020 | Skinner | G06F 18/217 |
| 2020/0099667 | A1 * | 3/2020 | Parthasarathy | H04L 9/3213 |
| 2020/0279041 | A1 * | 9/2020 | Endler | G06F 21/31 |
| 2021/0342413 | A1 * | 11/2021 | Knudtson | G06F 16/9566 |

\* cited by examiner

*Primary Examiner* — Daniel B Potratz
(74) *Attorney, Agent, or Firm* — Haynes and Boone, LLP

(57) ABSTRACT

There are provided systems and methods for a dynamic pixel display in electronic communications to enhance data security. Electronic network communications by a service provider, such as an electronic transaction processor for digital transactions, may be compromised by malicious computing attacks or other actions that compromise the security of the communications and corresponding data within the communications. To increase security of the data within a communication, such as text or images in an email, the service provider may utilize a pixel arrangement within a field of the communication that has corresponding identifiers and weblinks to backend pixel data that have randomized so that each pixel's location is variable between different communications. When the email is opened, code for the email may request the backend pixel data using the weblinks. A malicious party listening to the communication does not receive the data without having to reconstruct the randomized layout.

20 Claims, 5 Drawing Sheets ized pixel arrangement within a pixel field of an electronic communication to display data, such as one or more pixel layouts that display pixelated image data. Each pixel may be assigned a corresponding web link (e.g., a uniform resource locator (URL) or uniform resource identifier (URI) assigned to each pixel) with the hypertext markup language (HTML) or cascading style sheets (CSS) code associated with the electronic communication. Thus, when the electronic communication is accessed and opened, the service provider may return pixel display data dynamically for each pixel in the pixel arrangement. This allows the service provider to dynamically change the data for each pixel when the pixel arrangement is viewed and requested to display data from the service provider. Further, without knowing the particular pixel arrangement that has been randomized, a malicious user or other entity would require considerable computing resources to reconstruct, if at all, the dynamic pixel display.

DYNAMIC PIXEL DISPLAY IN ELECTRONIC COMMUNICATIONS TO ENHANCE DATA SECURITY

TECHNICAL FIELD

The present application generally relates to digital data security and more particularly to preventing digital data within electronic communications from being compromised by external entities.

BACKGROUND

Online service providers may provide services to different users, such as individual end users, merchants, companies, and other entities. When providing these services, the service providers may provide an online platform that may be accessible over a network, which may be used to send and receive different types of electronic communications including emails, instant messages, push notifications, and the like. Thus, users may utilize a computing device to access and view content within electronic communications. In some cases, the content may be sensitive or private, such as personally identifiable information (PII) or funding source information. This may include names and social security numbers, addresses or other locations, account numbers and balance, and other private user or business data. However, as hackers and other malicious users or entities become more sophisticated, they may perform different computing attacks and other malicious conduct to compromise these communications. Additionally, some communications may be impermissibly proliferated when unintended parties or entities receive the communications. For example, a typo or a mistaken email transmission (e.g., reply or forward action) may cause an email to be shared with impermissible parties. Thus, service providers require more robust and sophisticated manners of hiding or securing this data in the communications to prevent breach or access by undesired or unintended entities.

Figure 1:
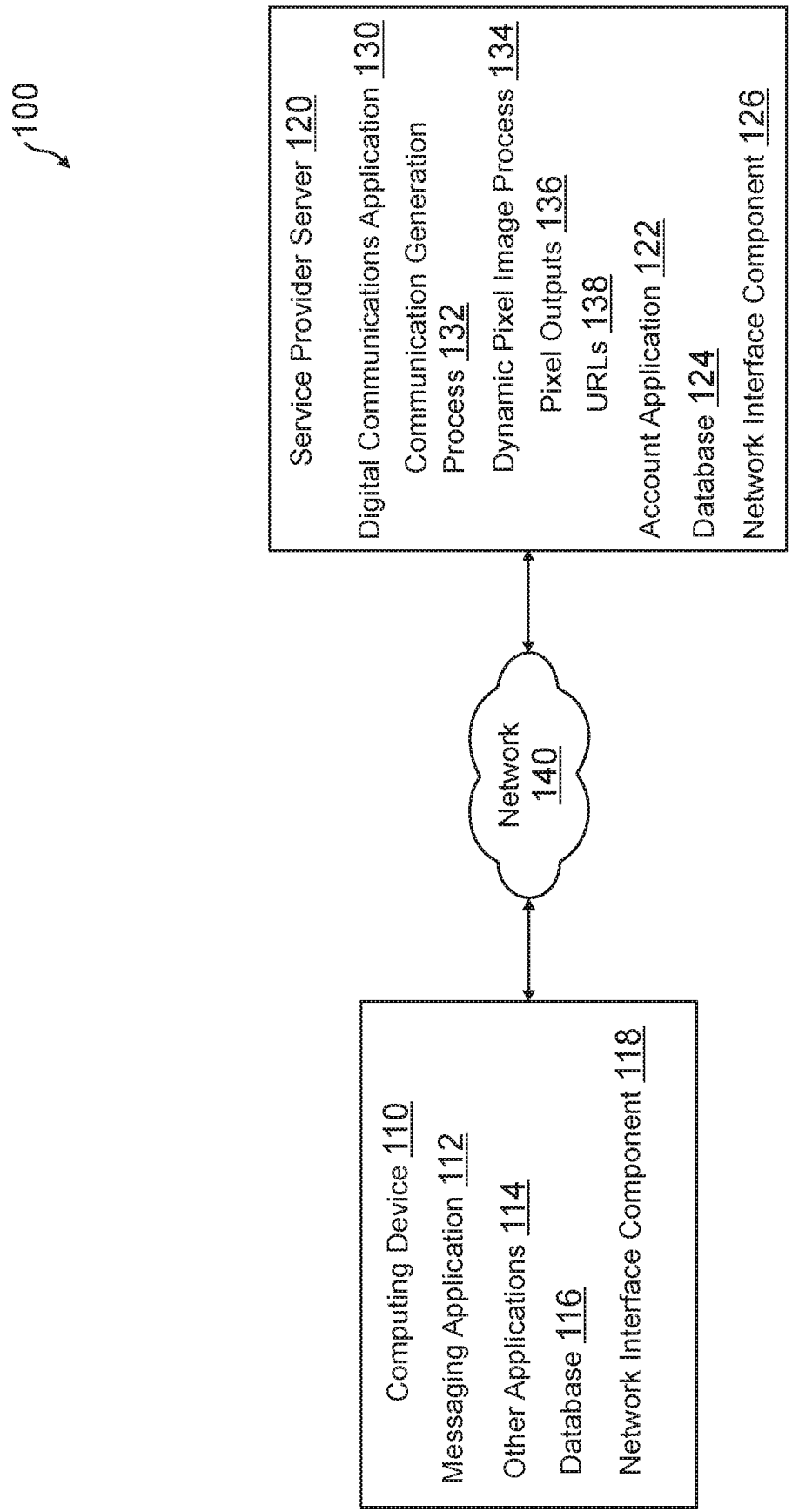
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a dynamic pixel display in electronic communications to enhance data security. Systems suitable for practicing methods of the present disclosure are also provided.

In network communications, such as between online platforms and systems for service providers and end users' client devices, electronic communications and other network computing architecture may face different types of computing attacks coming from malicious sources over a network. A bad actor may initiate a computing attack on the computing environment of the service provider, such as an eavesdropping attack, a password attack and/or account takeover, a web abuse (e.g., account enumeration, brute force attacks, SQL injection), or other type of computing attack that may compromise electronic communications, such as exposing data contained in the electronic communications to the bad actor. This computing attack may introduce risk to private, confidential, or sensitive data of users and/or the service provider, which may lead to fraud and loss. For example, electronic communications may be used to send and receive personally identifiable information (PII) and/or funding source information between the service provider and a user, which may be eavesdropped by a malicious party to read the data in an unauthorized manner. Further, an electronic communication may be accidentally shared in the event of a typo or mistaken transmission of the electronic communication.

In order to assist in preventing or minimizing these computing attacks and other abuses of the service providers, the service providers, in various embodiment, may utilize a dynamic pixel display through a random- For example, a service provider may provide electronic transaction processing to entities through digital accounts, including consumers and merchants that may wish to process transactions and payments. Other service providers may also provide computing services, including email, social networking, microblogging, media sharing, messaging, business and consumer platforms, etc. In order to establish an account, these different users may be required to provide account details, such as a login, password (and/or other authentication credential, such as a biometric fingerprint, retinal scan, etc.), and other account creation details. The account creation details may include identification information to establish the account, such as personal information for a user, business or merchant information for another entity, or other types of identification information including a name, address, and/or other information. The entity may also be required to provide financial or funding source information, including payment card (e.g., credit/debit card) information, bank account information, gift card information, benefits/incentives, and/or financial investments, which may be used to process transactions. The online payment provider may provide digital wallet services, which may offer financial services to send, store, and receive money, process financial instruments, and/or provide transaction histories, including tokenization of digital wallet data for transaction processing. The application or website of the service provider, such as PayPal® or other online payment provider, may provide payments and the other transaction processing services. However, malicious users, entities, and/or other computing devices (e.g., computing devices that may include malware, viruses, and the like that may be hijacked to automate computing attacks) may attempt to abuse electronic communications sent and/or received through digital accounts in order to compromise sensitive data, such as PII and/or funding source data, which may lead to exploitation and/or unauthorized use by these malicious parties.

Thus, a service provider may determine an electronic communication, such as an email, is required to be sent to a user, such as a consumer, merchant, or other entity associated with the service provider. The electronic communication may be required to be sent to provide some sensitive, private, or confidential information to the user or other entity, such as PII. In other embodiments, other data that is secure may be required to be sent, such as a two-factor authentication code or another authentication credential, an account balance or other financial information that may be sensitive, and the like. The service provider may utilize a randomized pixel arrangement within a field of the electronic communication to display the PII or other data. Thus, in order to present the PII or other data via the randomized pixel arrangement, the service provider first may determine a pixelated image of the PII or other data that may be presented through the pixel arrangement based on the pixels that are randomly arranged or laid out within the field. For example, the pixelated image may correspond to an output display of pixels within the field, such as required color for each pixel to display the required PII or other data.

Where the PII or other data for display corresponds to text information, each pixel may display one of a "no color" or a "color" output, such as an invisible (e.g., background color) or white pixel output, or instead a black pixel output. However, the data for the pixel arrangement may also be other images, including colored images. In some embodiments, the determination of the pixel image may also utilize user attributes, parameters, or information to determine the pixelated image. For example, if the user is older or has bad eyesight, the pixelated image may display the PII or other data in a larger and/or more readable font. Further, in some embodiments, the image may instead correspond to a series of images, such as an animation, that is required to display the PII or other data to a user. In such embodiments, the sequence may include multiple pixelated images for display, as well as identifiers for each image that allows for reconstruction of the image (e.g., a number 1-10 in a corner of the pixelated animation images so that a user can reconstruct the order of the images in the animation).

In some embodiments, the PII or other data may also be encoded or linked to using a displayable code, which may be output via the pixels in the pixel arrangement. For example, a barcode, QR code, or other displayable code may be used to encoded data into that code, which may allow for additional language, text, numbers, symbols, or the like to be encoded. This allows for association of additional amounts of data with the pixelated image than may be presented in plain text within the pixel arrangement (e.g., depending on the number of pixels in the pixel arrangement). In further embodiments, the displayable code or another image may be used to link to available online data through an imaging application when captured. Thus, the service provider may provide linked data when the image is captured and provided to the service provider so that additional amounts of data may be associated with pixelated image displayed through a pixel arrangement. When a displayable code is used, the PII or other data may be encoded and/or linked to the pixelated image so that the displayable code may be presented in the pixel arrangement within the electronic communication.

Thereafter, the service provider may then determine the randomized pixel arrangement so that the service provider may determine a color output or value for each pixel that causes the pixelated image to be displayed in the field having the pixel arrangement. The service provider may first determine a number of pixels for the field, which may be generic (e.g., 8,000 pixels) or may be specifically selected based on the pixelated image of the PII or other data and/or the electronic communication. With a higher pixel count, more security may be provided to the electronic communication and PII or other data for display in the field of the electronic communication. This is due to the difficulty in performing brute force attacks and computing actions to attempt to rebuild the pixel arrangement when placement of the pixels is randomized in the pixel arrangement. However, where less security is necessary, less pixels may be utilized in order to conserve computing resources and network communication links by reducing the number of web links and WebSocket communication channels (e.g., using the WebSocket protocol) required to return pixel data for each pixel in the pixel arrangement.

To randomize the pixel arrangement, placement of each pixel within the arrangement and corresponding field may be randomized so that the pixels are randomly placed and not according to their identifier and/or corresponding web links. For example, each pixel may be assigned an identifier and/or associated with a web link used to communicate with the service provider to return a pixel value via a corresponding WebSocket communication. Thereafter, each pixel is randomly sorted or arranged within the field for the pixel arrangement. Instead of using sequential ordering of the pixels according to their identifier and/or web link, the pixels may instead be randomly placed so that an ordering is unknown to eavesdropping malicious users. Thus, only by possessing the electronic communication and corresponding code allows for knowledge of the exact pixel arrangement. In other words, a malicious user that is able to access or view the network traffic being transmitted between a device of the user and the service provider may be able to see the pixel data being transmitted, but will not be able to arrange the pixels correctly to identify the sensitive user information. Each pixel is also assigned a web link to return the corresponding pixel data, which may be referenced in the HTML code, CSS code, or other code for the electronic communication based on the randomized pixel arrangement. In some embodiments, where an animation is utilized, each pixel may instead correspond to an animated image, such as a .gif image, so that each pixel may display a value or color for a length of time (e.g., 10-30 seconds) and then changed based on the next image in the animation.

Once the field's pixel arrangement has been determined, and the corresponding web links for each pixel assigned and/or determined for the electronic communication's code, the service provider may then determine output display data required to present the pixelated image via the field. This may correspond to determine a pixel output or color value (including null or invisible where no pixel output is to be displayed or changed) that corresponds to each pixel in the randomized arrangement to that the field displays the pixelated image. Thus, pixel presentation data may include the data required to be transmitted or returned to each corresponding pixel through a WebSocket or another communication when each web link is accessed. For example, when the electronic communication is opened, code within the electronic communication may request pixel data or a color value for each pixel using the web link assigned to each pixel, which may then be returned for display. When determining the data for display of the pixelated image, the service provider may also determine one or more validity terms, periods, or attributes for the data as well. This may include device data, such as valid and/or invalid IP addresses, MAC addresses, geo-locations, and/or other device data, as well as email addresses, account identifiers, and the like. Other validity terms may include valid times of day/week/month to display the data, an expiration data, a number of valid openings/viewings of the field and/ electronic communication, and the like. In some embodiments, the service provider may also predetermine one or more status error images or messages, fraud alerts or fraud detection messages, and/or obfuscated data that may be returned through the field when fraud or an error is detected (e.g., the pixelated image should not be shown through the field). However, this data may later be determined and/or accessed through stock images and data, such as at the time of detected error or fraud. Additionally, an error code or status error for a page not found or a webpage redirection (e.g., a 404 error status code for a "page not found") may instead be returned when a pixels data should not be shown.

Thereafter, the service provider may transmit the electronic communication to one or more accounts, email addresses, device identifiers, phone number or text message identifier, or the like. This may include valid accounts to receive the address. However, eavesdropping attacks and other malicious network spying or listening attackers may receive information for the electronic communication by monitoring network communications. For example, an eavesdropping attack may monitor portions of the electronic communication transmitted between the service provider and the valid user, device, and/or account receiving the electronic communication. In some embodiments, a transmission error or computing attack may cause the electronic communication to be sent to invalid addresses and users, including incorrect users as well as malicious users. This may also occur when a typo, mistaken transmission action, or the like may accidentally share or transmit the electronic communication to an incorrect address, account, device, or user.

If an invalid transmission is detected, the service provider may immediately invalidate the pixel display data for the pixelated image corresponding to the PII or other data. If the corresponding web links are accessed after the pixel display data has been invalidated, then no data will be returned, a 404 error will be returned, or another message that does not contain the pixel display data will be returned (as stated above). Additionally, if a validity term expires or is detected (e.g., an expiration date), the pixelated image's display data for the field may also be invalidated. However, if not, the service provider may wait for an access of the electronic communication that requests display of data via the field having the pixel arrangement, such as an opening of an email or other message and/or a request to view the data in the field.

After transmission of the electronic communication, the service provider may then detect an access of the electronic communication. This may be performed through code (e.g., HTML, CSS, or other code) for the electronic communication transmitting requests to receive pixel data for each pixel in the field of the electronic communication via the web link for each pixel. However, in other embodiments, other code may also be implemented in order to detect that the electronic communication has been accessed, opened, or viewed, such as through a message read detection operation. When receiving the request to return a pixel output or color value from each web link, a WebSocket or other communication channel may be established to communicate between the device accessing the electronic communication and the service provider's server. These communication channels may be generated for each web link and therefore corresponding pixel so that pixel data may be returned for each designated pixel within the pixel arrangement of the electronic communication's field.

In order to determine whether the pixelated image for the PII or other displayable data should be output via the field of the electronic communication, the service provider may perform a fraud assessment or risk analysis device and/or account accessing the electronic communication. The service provider may receive or access device data for the device, which may correspond to an IP address, MAC address, device fingerprint, geo-location or other device location, or other device data for the device. A risk analysis may then be performed of the device to determine if the device indicates a computing attack, malicious behavior, or fraud. For example, the device data may be compared to one or more blacklists of malicious devices or the data otherwise violates a risk rule or risk decision system. In other embodiments, further data may also or instead be analyzed. For example, an email address receiving and accessing the electronic communication, or other account identifier, may be used to determine if the account is acting maliciously, fraudulently, or validly, including whether the account was authorized to receive the electronic communication. A time of access, expiration data of the electronic communication, maximum number of openings of the electronic communication, or the like may also be used to determine whether the electronic communication is being validly accessed.

If the electronic communication is being validly accessed, pixel display data for display of the pixelated image of the PII or other data may be determined, which may be used to return pixel data or a valid pixel color value for each pixel to display the pixelated image. Thus, for text or images a particular pixel color value (e.g., black and white for text) may be used to display text of the PII or other data within the field based on the pixelated image of the PII or other data. In some embodiments, in order to conserve network resources and communications, pixel color values or other pixel data for background colors (e.g., white for the background to contrast with the black color of text), may not be required to be returned. For example, instead of returning a white pixel color value or data, no pixel value or data (e.g., an invisible pixel) may be returned so that the pixel maintains the same white (or other color) background for the electronic communication. Thus, for WebSocket communication channels for "white" pixels, the channel may be timed out after a period of no response by the service provider, and no pixel data may be returned. Further, the black pixels may be returned via the communication channels for each web link so that the black pixels may make up the displayable data for the pixelated image. Since with text, the black pixels may make up 15-20% of the pixels, the service provider may conserve 80+% of network communication and computing resources in returning pixel values. Further, some pixels may be grouped into URL or URI groupings that allow for a single web link to return pixel data. Further, external hosted CSS data by the service provider may be used to dynamically change mappings and color values for pixels However, if the access to the electronic communication appears fraudulent, malicious, or unauthorized, the service provider may determine to change the display values or data for the field having the pixel arrangement in the electronic communication. This may be done to obfuscate the data within the electronic communication so that the PII or other data is not output through the field. However, in further embodiments, fraud alert, or other data that indicates the unauthorized access may be provided. Additionally, a webpage or data returned for the pixels when an unauthorized access of the electronic communication is detect may correspond to an error code, status error message, or other "page not found" error code that does not return pixel data and/or displays different data within the pixel. This may occur immediately, such as when an accidental or mistaken transmission of an electronic communication is detected, such as when a typo or mistaken action (e.g., forwarding, reply, etc.) occurs. In further embodiments, this may also occur when the electronic communication is accessed by the incorrect user, such as based on device data, a fingerprint, network address, or the like. Moreover, in the event of a typo or accidental transmission of the electronic communication, the information presented within the pixel arrangement may be changed to present the correct information for the receiving party and/or change the displayed image based on the receiving party. For example, the receiving party may receive information directed to the receiving party (e.g., PII for the receiving party). However, other images may also be displayed (e.g., to obscure the PII for the originally intended party).

In some embodiments, the service provider may also provide data that appears valid but may be used to tracking purposes to gain better knowledge of the malicious party, such as a honeypot password or code that is not valid but may be used to determine the malicious entity when the code is entered. Thus, the data may be changed quickly on the backend of the service provider so that data is not compromised when unauthorized transmissions and/or access is detected, thereby preserving the data for security concerns. Further, the service provider may utilize the randomization of the pixel arrangement so that eavesdropping attacks are unable to rebuild the data from multiple communication channels without having the underlying layout or arrangement.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entity.

System 100 includes a computing device 110 and a service provider server 120 in communication over a network 140. Computing device 110 may be utilized by a user to receive communications over network 140, where service provider server 120 may provide various data, operations, and other functions over network 140 to provide messages, data, images, and other pixelated data. In this regard, computing device 110 may determine a pixelated image for PII or other data to display in a pixel arrangement within a field of an electronic communication, such as an email. Service provider server 120 may transmit the electronic communication, and when the electronic communication is accessed and/or opened, determine whether to reconstruct and display the pixelated image via the pixel arrangement within the field.

Computing device 110 and service provider server 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 140.

Computing device 110 may be implemented as a communication device that may utilize appropriate hardware and software configured for wired and/or wireless communication with service provider server 120. For example, in one embodiment, computing device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one device is shown, a plurality of devices may function similarly and/or be connected to provide the functionalities described herein.

Computing device 110 of FIG. 1 contains a messaging application 112, a database 116, and a network interface component 118. Messaging application 112 and other applications 114 may correspond to executable processes, procedures, and/or applications with associated hardware. In other embodiments, computing device 110 may include additional or different modules having specialized hardware and/or software as required.

Messaging application 112 may correspond to one or more processes to execute software modules and associated components of computing device 110 to provide features, services, and other operations for a user over network 140, which may include receiving and displaying messages and electronic communications from service provider server 140. In this regard, messaging application 112 may correspond to specialized software utilized by a user of computing device 110 that may be used to access a website or user interface (UI) that may display one or more electronic communications. In various embodiments, messaging application 112 may correspond to a general browser application configured to retrieve, present, and communicate information over the Internet (e.g., utilize resources on the World Wide Web) or a private network. For example, messaging application 112 may provide a web browser, which may send and receive information over network 140, including retrieving website information (e.g., a website for an email provider or other messaging service), presenting the website information to the user, and/or communicating information to the web site. However, in other embodiments, payment messaging application 112 may include a dedicated application of service provider server 120 or other entity (e.g., an email provider or messaging service). Messaging application 112 may be associated with account information, user financial information, and/or transaction histories. However, in further embodiments, different services may be provided via messaging application 112, including social networking, media posting or sharing, microblogging, data browsing and searching, online shopping, and other services available through service provider server 120 that may be utilized in conjunction with messaging services. Thus, messaging application 112 may also correspond to different service applications and the like.

When using messaging application 112, an electronic communication may be received that includes a field having a randomized pixel arrangement, where each pixel has a corresponding web link (e.g., URL or URI) that is used to fetch data for display in the pixel (e.g., a pixel value or color). The web links may be referenced and utilized by code (e.g., HTML code) for the electronic communication so that when the electronic communication is accessed and opened, each web link is called to retrieve pixel display data, such as a pixelated image of PII or other data, from service provider server 120. Retrieval of the data may be done through a web connection, such as a Web Socket communication channel or connection. This allows for display of the PII or other data through the pixel arrangement in the field. If a bad actor executes a computing attack to perform some operation to compromise an electronic communication from service provider server 120 and/or conduct fraud, including account takeover where a message may be viewed when not authorized, the computing attack may attempt to discover secret or sensitive information, takeover an account, request fraudulent electronic transaction processing, or otherwise perform an conduct that attempts to listen or eavesdrop on data transmissions for electronic communications. During this conduct, service provider server 120 may provide the pixel display data to the randomized pixel arrangement so that the pixelated image would require significant time and processing resources to attempt to rebuild without knowledge of the pixel placements within the randomized pixel arrangement. Further, if the electronic communication is being viewed by an unauthorized user and/or device, service provider server 120 may perform a security check and/or fraud assessment to determine that different pixel display data should be returned to protect the underlying PII or other data.

In various embodiments, computing device 110 also includes other applications 114 as may be desired in particular embodiments to provide features to computing device 110. For example, other applications 114 may include security applications for implementing client-side security features, programmatic client applications for interfacing with appropriate application programming interfaces (APIs) over network 140, or other types of applications. Other applications 114 may also include additional communication applications, such as email, texting, voice, social networking, and IM applications that allow a user to send and receive emails, calls, texts, and other notifications through network 140, which may include interfacing with messaging application 112 for the opening and viewing of communications having pixel arrangements. Other applications 114 may be utilized with service application 112 to utilize an account and/or service, as well as provide device and/or user data to service provider server 120 that may be used during AI decision-making. Other applications 114 may include device interfaces and other display modules that may receive input and/or output information. For example, other applications 114 may contain software programs, executable by a processor, including a graphical user interface (GUI) configured to provide an interface to the user.

Computing device 110 may further include a database 116 stored on a transitory and/or non-transitory memory of computing device 110, which may store various applications and data and be utilized during execution of various modules of computing device 110. Database 116 may include, for example, identifiers such as operating system registry entries, cookies associated with messaging application 112 and/or other applications, identifiers associated with hardware of computing device 110, or other appropriate identifiers, such as identifiers used for payment/user/device authentication or identification, which may be communicated as identifying the user/computing device 110 to service provider server 120. Moreover, database 116 may store electronic communications received from service provider server 120, including those having pixel arrangements within display fields for display of pixel display data associated with PII or other data.

Computing device 110 includes at least one network interface component 118 adapted to communicate with service provider server 120. In various embodiments, network interface component 118 may include a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency, infrared, Bluetooth, and near field communication devices.

Service provider server 120 may be maintained, for example, by an online service provider, which may provide operations for transmissions of electronic communications, such as emails, including pixel arrangements for display of pixelated images including text, graphics, and the like. In this regard, service provider server 120 includes one or more processing applications which may be configured to interact with computing device 110 to transmit an electronic communication to computing device 110, which may be used to display data within the pixel arrangements. In one example, service provider server 120 may be provided by PAYPAL®, Inc. of San Jose, Calif., USA. However, in other embodiments, service provider server 120 may be maintained by or include another type of service provider.

Service provider server 120 of FIG. 1 includes a digital communications application 130, an account application 122, other applications 124, a database 124, and a network interface component 126. Digital communications application 130 and other applications may correspond to executable processes, procedures, and/or applications with associated hardware. In other embodiments, service provider server 120 may include additional or different modules having specialized hardware and/or software as required.

Figure 2:
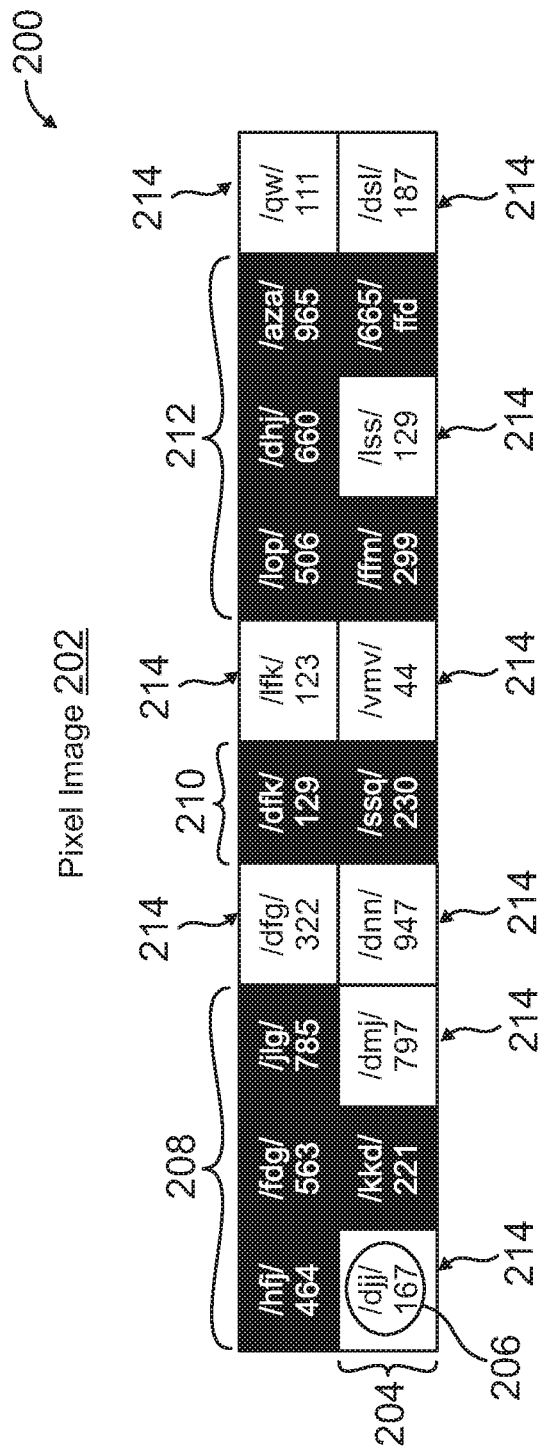
FIG. 2 is an exemplary block diagram of a pixel arrangement that includes a randomized mapping of pixels to web links to dynamic pixel data display, according to an embodiment.

Digital communications application 130 may correspond to one or more processes to execute modules and associated specialized hardware of service provider server 120 to provide digital electronic communications, such as emails, network messages and communications, push notifications, and the like. In this regard, digital communications application 130 may correspond to specialized hardware and/or software used by service provider server 120 to first determine data to display via a pixel arrangement, which may include PII, authentication or account data (including a password, PIN, or 2-factor authentication code), or other sensitive or private data that may be desirable to secure. Communication generation process 132 may generate an electronic communication, such as an email, that includes PII or other data. The PII or other data for display in an electronic communication may correspond to data that is to be entered to the electronic communication and transmitted to a user, such as PII or other data within an email for transmission to a user. Thereafter, communication generation process 132 may determine a field to display the data, where the field includes a plurality of pixels (e.g., several hundred to thousands in order to properly display data). Such a field having pixels is shown in FIG. 2. When determining the field, communication generation process 132 of digital communications application 130 may then randomize a pixel arrangement within the field, where pixels are not sequentially organized or otherwise organized in a manner according to their identifier and/or associated web link for pixel display color or value retrieval. This may include randomizing the ordering and organization of the pixels within the field's arrangement.

Based on the randomized pixel arrangement, communications application 130 may determine a pixelated image that may be used to display the PII or other data required for the electronic communication in a displayable pixel layout. The pixelated image may therefore correspond to pixel display data that includes pixel outputs 136 that may be used to display the pixelated image by returning a pixel color or value that causes display of the pixelated image via a pixel layout. Pixel outputs 136 may also be adjusted in order to display obfuscated data, including an error message or image, a fraud alert, or other image that may hide the PII or other data. Where pixel outputs 136 are not return, instead an error status code or other webpage error code may be returned and displayed, or not data may be displayed. Thus, different pixel layouts may display different data when different devices attempt to access or display the pixelated data (e.g., an authorized device and/or unauthorized device). Each pixel within the randomized pixel arrangement may be associated with an identifier and/or web link, such as URLs 138 (as well as URIs or other linked data) that may make a web call (e.g., via one or more API interactions and/or calls) to service provider server 120 in order to retrieve a pixel value or color for display via the pixel. This may cause display of a pixelated image via the pixel arrangement. Communication generation process 132 may reference each of these URLs 138 in code for the electronic communication, such as HTML code for an email. Communication generation process 132 may then complete generation of the electronic communication, which may be transmitted to computing device 110 via digital communications application 130.

Thereafter when the electronic communication is opened, dynamic pixel image process 134 may determine whether to return the pixelated image via pixel outputs 136. For example, on opening of an email, the email's HTML code may utilize URLs 138 to request pixel display data for the pixels within the randomized pixel arrangement in the field of the electronic communication. This may correspond to an output pixel color or value at each of the pixels within the randomized pixel arrangement of the electronic communication. Dynamic pixel image process 134 may determine an IP address, a MAC address, or a device fingerprint, which may be used to determine whether computing device 110 is an authorized device (as well as not compromised or risky) to open the electronic communication and display the pixelated image via the pixel arrangement. In some embodiments, dynamic pixel image process 134 may also utilize an identifier for an account, such as an email account, a messaging account, or a social networking account in order to determine whether the account has authorization to access and open the electronic communication.

If authorized, dynamic pixel image process 134 may provide pixel outputs 136 corresponding to the pixel display data used to render and display the pixelated image of the PII or other data via the pixel arrangement in the field of the electronic communication. Pixel outputs 136 may be retrieved via URLs 138, where each of URLs 138 in the electronic communication cause establishment of a communication channel, such as through Web Socket or the like. In some embodiments, portions of the communication channels via Web Socket may be timed out for white or no color pixels so that all of the communication channels are not required to transmit data for the pixel displays. Thus, only those pixels having black or another color may keep communication channels open for transmission of pixel outputs 136. Since the pixel arrangement is randomized, reconstruction of the pixelated image from pixel outputs 136 would be time consuming and resource intensive, thereby securing the data. However, if computing device 110 in not authorized to open the electronic communication and/or shows indications of fraud or security breach, dynamic pixel image process 134 may instead provide obfuscated data via pixel outputs 136 in order to hide the pixelated image of the PII or other data.

Account application 122 may correspond to one or more processes to execute modules and associated specialized hardware of service provider server 120 to perform a service to end users of service provider server 120, such as sending and receiving electronic communications with computing device 110. In this regard, account application 122 may correspond to specialized hardware and/or software used by a user associated with computing device 110 to perform one or more messaging or communication services. Account application 122 may correspond to messaging, social networking, media posting or sharing, microblogging, data browsing and searching, online shopping, and other services available through service provider server 120. Account application 122 may be used by a user to establish a payment account and/or digital wallet, which may be used to generate and provide user data for the user, as well as view communications from digital communications application 130. In various embodiments, financial information may be stored to the account, such as account/card numbers and information. A digital token for the account/wallet may be used to send and process payments, for example, through an interface provided by service provider server 120. In some embodiments, the financial information may also be used to establish a payment account and provide payments through the payment account. The payment account may be accessed and/or used through a browser application and/or dedicated payment application. Further, the account may be used to receive electronic communications having a field with a randomized pixel arrangement used to display pixelated images for PII or other data.

Additionally, service provider server 120 includes database 124. Database 124 may store various identifiers associated with computing device 110. Database 124 may also store account data, including payment instruments and authentication credentials, as well as transaction processing histories and data for processed transactions. Database 124 may store financial information or other data generated and stored by other applications. Database 124 may also include PII and/or other sensitive or private data, which may be transmitted through an electronic communication having a randomized pixel arrangement within a field used to display the PII or other data. In this regard, these electronic communications and associated data, such as pixel outputs 136 and URLs 138 may also be stored by database 124.

In various embodiments, service provider server 120 includes at least one network interface component 126 adapted to communicate computing device 110 over network 140. In various embodiments, network interface component 126 may comprise a DSL (e.g., Digital Subscriber Line) modem, a PSTN (Public Switched Telephone Network) modem, an Ethernet device, a broadband device, a satellite device and/or various other types of wired and/or wireless network communication devices including WiFi, microwave, radio frequency (RF), and infrared (IR) communication devices.

Network 140 may be implemented as a single network or a combination of multiple networks. For example, in various embodiments, network 140 may include the Internet or one or more intranets, landline networks, wireless networks, and/or other appropriate types of networks. Thus, network 140 may correspond to small scale communication networks, such as a private or local area network, or a larger scale network, such as a wide area network or the Internet, accessible by the various components of system 100.

FIG. 2 is an exemplary block diagram 200 of a pixel arrangement that includes a randomized mapping of pixels to web links to dynamic pixel data display, according to an embodiment. Diagram 200 of FIG. 2 includes a pixel image 202 shown within a simplified pixel arrangement, such as one that may be displayed within an electronic communication (e.g., an email). The electronic communication may be transmitted by a service provider, such as service provider server 120, which may include the pixel arrangement used to display pixel image 202. In this regard, the service provider may generate the electronic communication and pixel arrangement based on randomization of pixel placements within the arrangement such that pixels and their corresponding identifiers and/or web links, are placed in a random arrangement within a field corresponding to the pixel arrangement. Thereafter, the web links may be used to retrieve pixel display data, such as a pixel color or value for each pixel, that causes display of pixel image 202.

Pixel image 202 is therefore displayed through the pixels shown in diagram 200. For example, an exemplary pixel 204 is shown as a single block pixel; however, other pixel shapes and/or groupings may be used (e.g., a grouping of 2 or more pixels that may have the same or similar web link to allow for coloration of the pixel grouping). Pixel 204 may correspond to a single pixel within a physical output display (e.g., a pixel within a display monitor), as well as groupings of pixels in the display monitor. Additionally, as shown in diagram 200, a web link 206, such as a URL, URI, or the like, is shown as assigned to pixel 204. Within the other pixels in diagram 200, each pixel has a corresponding different web link. In diagram 200, the pixels and the corresponding web links are randomized in a manner such that the web links and/or identifiers are not sequential and/or organized in a particular manner (e.g., by alphanumeric identifiers for the web links). Therefore, in order to display pixel image 202, the layout and arrangement of the pixels in diagram 200 is required or the returned colors or values for the pixel display data are not shown in a proper order and placement that allows for presentation and display of pixel image 202.

Web link 206 is shown as having a specific unique web link and/or identifier for retrieval of a color, value, or other data for display within pixel 204. Web link 206 therefore includes an alphanumeric identifier for a web link that specifically may be used to a database table lookup and/or points to specific online data that allows for returning of a color for pixel 204. Further, web link 206 may be referenced in the software code, such as HTML code, for an electronic communication having the pixel arrangement in diagram 200. For example, each of the web links shown in diagram 200 are referenced in the code so that when the corresponding electronic communication is opened, each web link is accessed so that a data request is sent to a backend server of the service provider via a network communication channel, such as a WebSocket channel. This allows for retrieval of the correspond pixel color or value for each pixel. For example, when the corresponding electronic communication is opened, the web links are used to fetch or retrieve pixel display data for pixel image 202 having a pixel color or value for each pixel in diagram 200.

In this regard, pixel image 202 displays the word "TIN", which may correspond to PII or other data that may be secret, sensitive, or private. In order to reconstruct TIN, 3 letters are required, as shown from a first pixel group 208, a second pixel group 210, and a third pixel group 212. Additionally, to provide contrast and viewing of the individual letters, white pixels 214 are also required, which include pixel 204. Thus, when the electronic communication is opened, the communication's code may make calls and/or requests to the corresponding service provider server using web link 206 and the other web links in diagram 200. This may establish different communication channels, such as through WebSocket. In diagram 200, to display pixel image 202, the pixel arrangement is 10×2 pixels, or 20 total pixels, which causes 20 different communication channels. Thereafter, a black pixel value may be returned via the communication channels for first pixel group 208, second pixel group 210, and third pixel group 212. This allows for display of the letter T for first pixel group 208, the letter I for second pixel group 210, and the letter N for third pixel group 212.

Moreover, for white pixels 214, a white color value may be returned, or a no color value (e.g., invisible or no returned data). In some embodiments, for white pixels 214, the corresponding communication channels may be timed out quickly, such as after a brief (e.g., 10 milliseconds) delay, which allows for reduction of the over network communication channels and network/processing resources. For example, in diagram 200, by timing out the communication channels for white pixels 214, 9 less communication channels are required, and therefore only 11 communication channels stay open to provide a color value for the black pixels in first pixel group 208, second pixel group 210, and third pixel group 212. Thereafter, pixel image 202 then displays the text TIN within diagram 200. In various embodiments, instead of generating the text TIN within diagram 200, other representations of data may be provided. For example, a barcode, QR code, or other scannable image/code may be represented in diagram 200, which may include encoded data and/or link to available data. The scannable code may be used to encoded and/or link to additional data so that diagram 200 may correspond to a larger amount of data and/or may include less pixels to conserve network resources and provide additional convenience to users and service providers.

Figure 3:
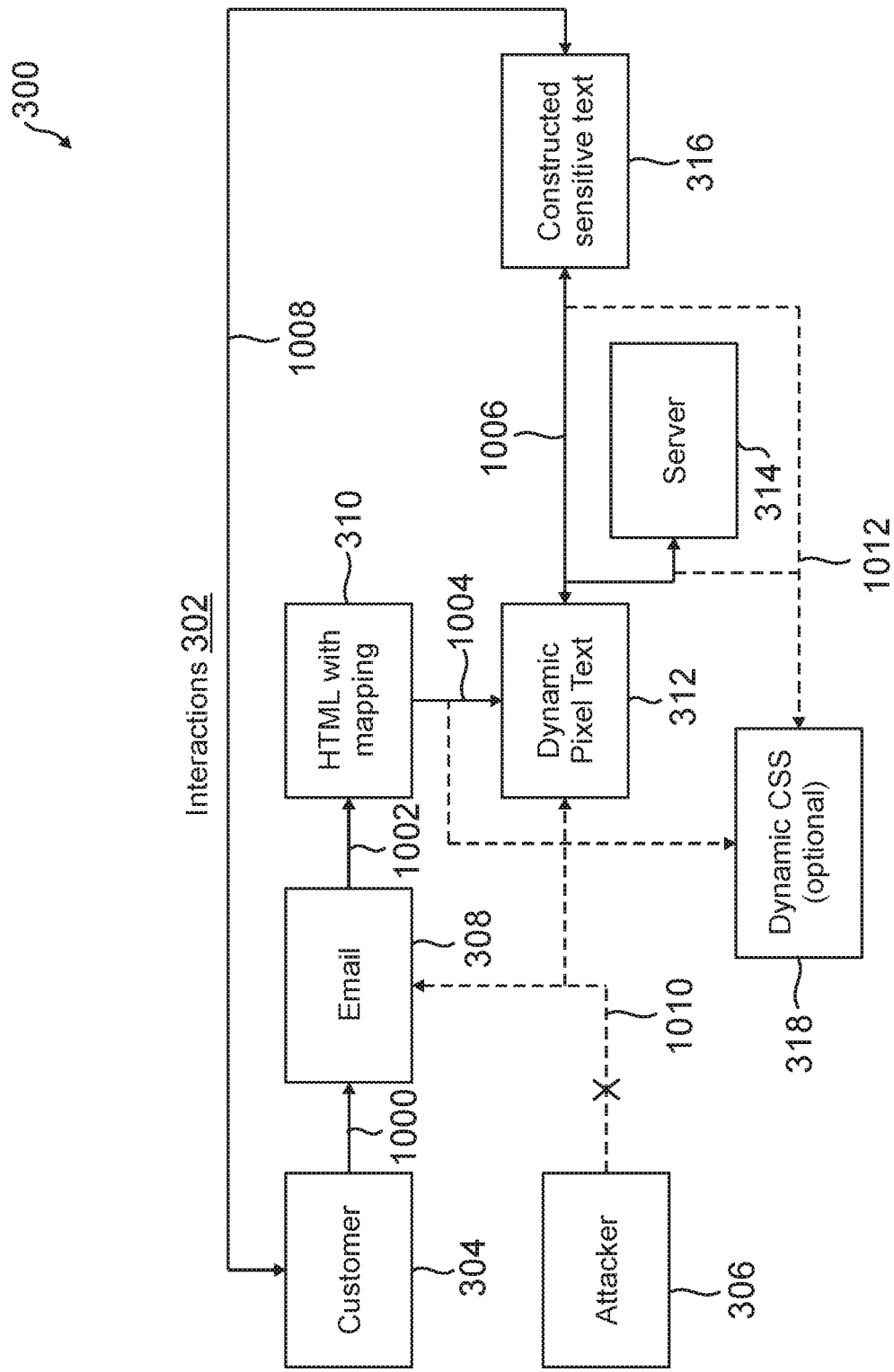
FIG. 3 is an exemplary environment where a service provider server may interact with a client device to provide dynamic pixel data display through a pixel arrangement in an electronic communication, according to an embodiment.

FIG. 3 is an exemplary environment 300 where a service provider server may interact with a client device to provide dynamic pixel data display through a pixel arrangement in an electronic communication, according to an embodiment. Environment 300 includes interactions 302 that may be performed by computing device 110 and service provider server 120 discussed in reference to system 100 of FIG. 1. In this regard, a customer 304 may utilize computing device 110 to receive an electronic communication that may include a pixel field having a randomized arrangement of pixels for display of a pixelated image.

In environment 300, interactions 302 display return of pixel display data for a pixelated image that displays PII or other data through a field within an electronic communication. This field includes a randomized arrangement of pixels such that placement of each pixel is performed in a random order to defeat simple reconstruction of the pixel arrangement through alphanumeric identifiers and the like. Thus, customer 304 may initially open and/or access an email 308 or other electronic communication from an external provider that has the pixel arrangement in a field of email 308, at interaction 1000. Interaction 1000 may occur when customer 304 accesses an email service provider and/or web server and requests display of contents within email 308. Thereafter, email 308 may execute code or contain executable code for HTML with mapping 310, at interaction 1002, which corresponds to HTML code having web links to each pixel's backend server data (e.g., display color or value). Within HTML with mapping 310, email 308's code may cause the web links to open and/or be established, such as through WebSocket connections, with the backend server.

Thus, at interaction 1004, HTML with mapping 310 may then request a dynamic pixel-text 312 within email 308 through the network communication connections or channels with the backend server that causes rendering and display of PII or other data through email 308. In this regard, interaction 1004 causes HTML with mapping 310 to request display of dynamic pixel text 312 in the field having the pixel arrangement in email 308. At interaction 1006, data for dynamic pixel text 312 is requested from a server 314, which may then render constructed sensitive text 316. For example, at interaction 1006, data is provided to server 314 that may be used to determine what text is rendered and displayed from dynamic pixel text 312. For example, an IP address, a MAC address, or a device fingerprint may be provided to server 314 for the device of customer 304, which may be used for a determination of whether email 308 is being validly opened in an authorized manner. This may also include a check for the account (e.g., email, social networking, messaging, and the like) opening email 308 in the event that email 308 was transmitted to an incorrect account and/or impermissibly or accidentally sent or forwarded to another account (e.g., when a typo or mistaken action occurs when transmitting email 308).

Further, server 314 may also determine whether opening of email 308 complies with one or more validity parameters and/or terms, such as an expiration date, valid geo-locations, authorized devices/accounts, viewing times, and the like. If server 314 determines that the data may be validly returned, constructed sensitive text 316 may be determined, which may correspond to an image or other pixelated data of the corresponding PII or other data. Thus, constructed sensitive text 316 may include pixel display data for at least a portion of the pixels in email 308. However, in other embodiments, constructed sensitive text 316 may instead correspond to obfuscated text of the PII or other data, which may indicate that email 308 is not authorized to be opened and/or viewed by customer 304, is being eavesdropped by an attacker 306, and/or is otherwise compromised. In such events, the pixel display data for email 308 may correspond to data that hides or obscures the PII or other data, including a page not found or 404 page error status code.

Thereafter, at interaction 1008, pixel display data is returned to customer 304, which may be displayed via one or more user interfaces of a computing device for customer 304 when viewing email 308. Interaction 1008 is shown by rendering constructed sensitive text 316 by providing pixel display data for a randomized arrangement of pixels within a field of email 308. However, attacker 306 may attempt to eavesdrop or otherwise compromise email 308, at interaction 1010. Attacker 306 may not have access directly to email 308 that includes the actual arrangement of the pixels (which has been randomized for email 308). For example, attacker 306 may eavesdrop on the network communications such that pixel display data and/or returned pixel colors or values for each pixel is detected and/or determined by attacker 306, at interaction 1010. However, without the actual arrangement of the pixels, reconstruction of constructed sensitive text 316 displaying the PII or other data, even if possible, would require brute force and numerous attempts. With a large pixel field, such as 8,000 pixels, the number of attempts may be so numerous to be considered impossible or too time and/or resource intensive. Thus, constructed sensitive text 316 may be protected through the pixel arrangement in email 308. Further, an optional interaction 1012 may also be performed, such as between interactions 1004, 1006, and 1008, where a dynamic CSS 318 may be utilized to dynamically rearrange and/or change pixel values within the pixel arrangement. For example, an external hosted CSS with email 308 may be used to change the pixel arrangement through dynamic CSS 318.

Figure 4:
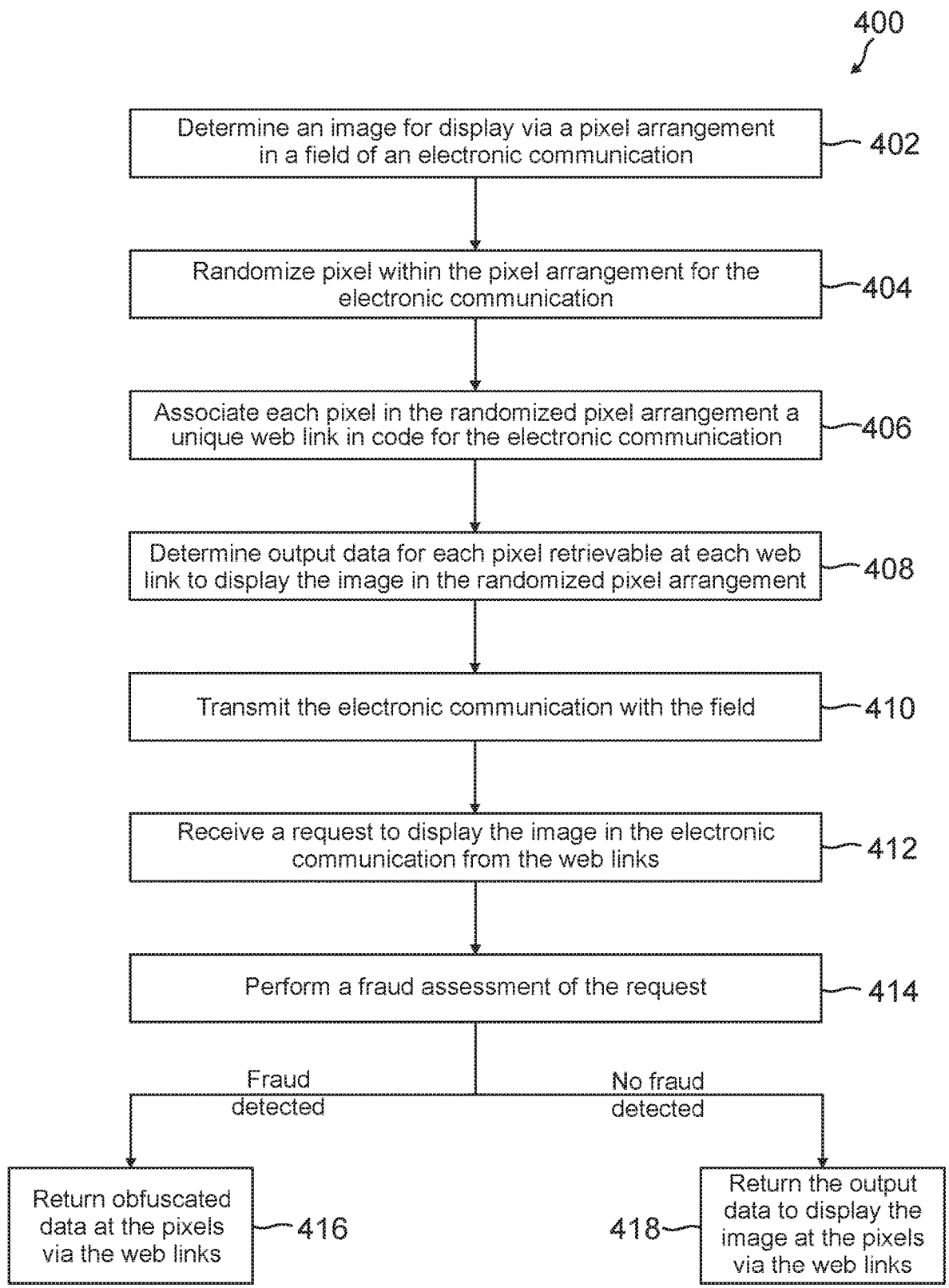
FIG. 4 is a flowchart for a dynamic pixel display in electronic communications to enhance data security, according to an embodiment.

FIG. 4 is a flowchart 400 for a dynamic pixel display in electronic communications to enhance data security, according to an embodiment. Note that one or more steps, processes, and methods described herein of flowchart 400 may be omitted, performed in a different sequence, or combined as desired or appropriate.

At step 402 of flowchart 400, an image for display via a pixel arrangement in a field of an electronic communication is determined. This may include determining PII or other sensitive, confidential, or private data, including authentication data and shared secrets, that is to be sent to a user via an email or other electronic communication. In one or more embodiments, the information in the electronic communication may be scanned, using optical character recognition, natural language processing, and/or machine learning techniques to identify the PII or other sensitive, confidential or private data within the electronic communication.

A service provider transmitting the electronic communication may determine a pixelated image that may cause display of the corresponding image through a pixel arrangement within a field or other portion of the electronic communication. However, in further embodiments, once the data for the image is determined, the pixelated image may later be generated and/or adjusted. For example, based on a user or account opening the email or other electronic communication, display of the PII or other data may be adjusted (e.g., increasing or decreasing a font size, change a font, adjusting text color and/or background, and the like).

Once the image is determined, pixels within the pixel arrangement for the electronic communication are randomized, at step 404. Randomization of the pixels may correspond to changing the ordering and/or placement so that the pixels are not arranged sequential and/or corresponding to their alphanumeric identifiers and/or corresponding web links (e.g., URL/URI codes or identifiers). Thus, the pixel arrangement may correspond to randomizing the placements of pixels so that reordering of the pixels is difficult if not impossible due to the computing resources required to brute force attack and reorder the pixels. For example, with thousands of pixels, rearrangement of the pixels may take a large amount of resources and time to determine the randomized order. Thereafter, at step 406, each pixel in the randomized pixel arrangement is associated with a unique web link in code for the electronic communication. For example, each pixel may be assigned or otherwise provided with a unique web link that allows for retrieval of pixel data, such as a color or value, that is output via the corresponding pixel. Each web link may be used by the code for the electronic communication to request the pixel data from the backend server and database, so presentation of the image or other data may be performed through the randomized pixel arrangement.

At step 408, output data for each pixel retrievable at each web link is determined to display the image in the randomized pixel arrangement. This output data may correspond to pixel display data that causes at least a portion of the pixels in the randomized pixel arrangement to display the corresponding pixelated image. For example, each pixel may be assigned a color, value, or other display data that causes the image of the PII or other data to be displayed in the randomized pixel arrangement. Further, in some embodiments, validity terms or parameters may be determined for returning the output data, such as an expiration time, number of viewings/openings of the electronic communication, valid geo-locations, users, accounts, and/or device, or the like. Such validity terms may be required to be checked prior to returning the output data, and if the opening violates one or more terms, causes different pixel display data to be returned.

The electronic communication is then transmitted with the field having the randomized pixel arrangement, at step 410. This may include transmitting to any selected accounts or other communication identifiers. However, the electronic communication may be accidentally or maliciously shared or transmitted, such as to unauthorized or malicious accounts/users. For example, a computing attack, typo in an account identifier or email address, or the like may cause an electronic communication to be impermissibly shared. Thus, at step 412, a request to display the image in the electronic communication is received, for example, via the web links within the code of the electronic communication. In this regard, when the electronic communication is opened and viewed, code for the electronic communication may utilize the web links to establish communication channels or connections with the backend server to return an output for each pixel in the randomized pixel arrangement. Prior to returning data, a fraud assessment of the request is performed, at step 414, which may include assessing an IP address, a MAC address, or a device fingerprint, as well as an account identifier (e.g., email, social networking, messaging, and the like) and/or validity terms that are associated with the electronic communication. This data may be detected and/or received in response to detecting the opening of the electronic communication.

If fraud is detected or suspected, at step 416, obfuscated data is returned at the pixels via the web links. For example, a malicious or unauthorized user may obtain the electronic communication. However, based on the fraud assessment, the service provider may determine that the opening of the electronic communication is unauthorized. Thus, the service provider may determine to hide the PII or other data from display in the randomized pixel arrangement of the electronic communication's field. The obfuscated data may provide garbled or otherwise unrecognizable data, or each pixel may receive and/or display an error code or status error that displays an error code or no pixel data. In some embodiments, the obfuscate data may also include a phishing attempt and/or honeypot data that may attempt to have the malicious user use the data for enhanced identification of the malicious user. Moreover, the receiving user and/or device of the electronic communication may be determined so that if a typo in the email address of other identifier for the intended user occurs, or if the electronic communication is accidentally transmitted to the receiving party, different data may be provided through the pixels via the web links. For example, PII or other data intended for the receiving user (and not the intended user) may instead be provided through the electronic communication (e.g., via the pixels). The obfuscated data may also include other data for the receiving party and/or in order to hide the PII or other data via the pixels.

In contrast, if no fraud is detected, at step 418, the output data (e.g., the pixel display data for the pixelated image of the PII or other data) is returned to display the image at the pixels via the web links. Thus, a user interface of a computing device opening the email in an authorized manner may then display the image through the randomized pixel arrangement in the field of the electronic communication. Moreover, if step 418 occurs, any malicious user eavesdropping on the network communications between the valid user's device and the service provider, may only view garbled or obfuscated data without knowledge of the exact layout and placement of the pixels within the randomized pixel arrangement.

Figure 5:
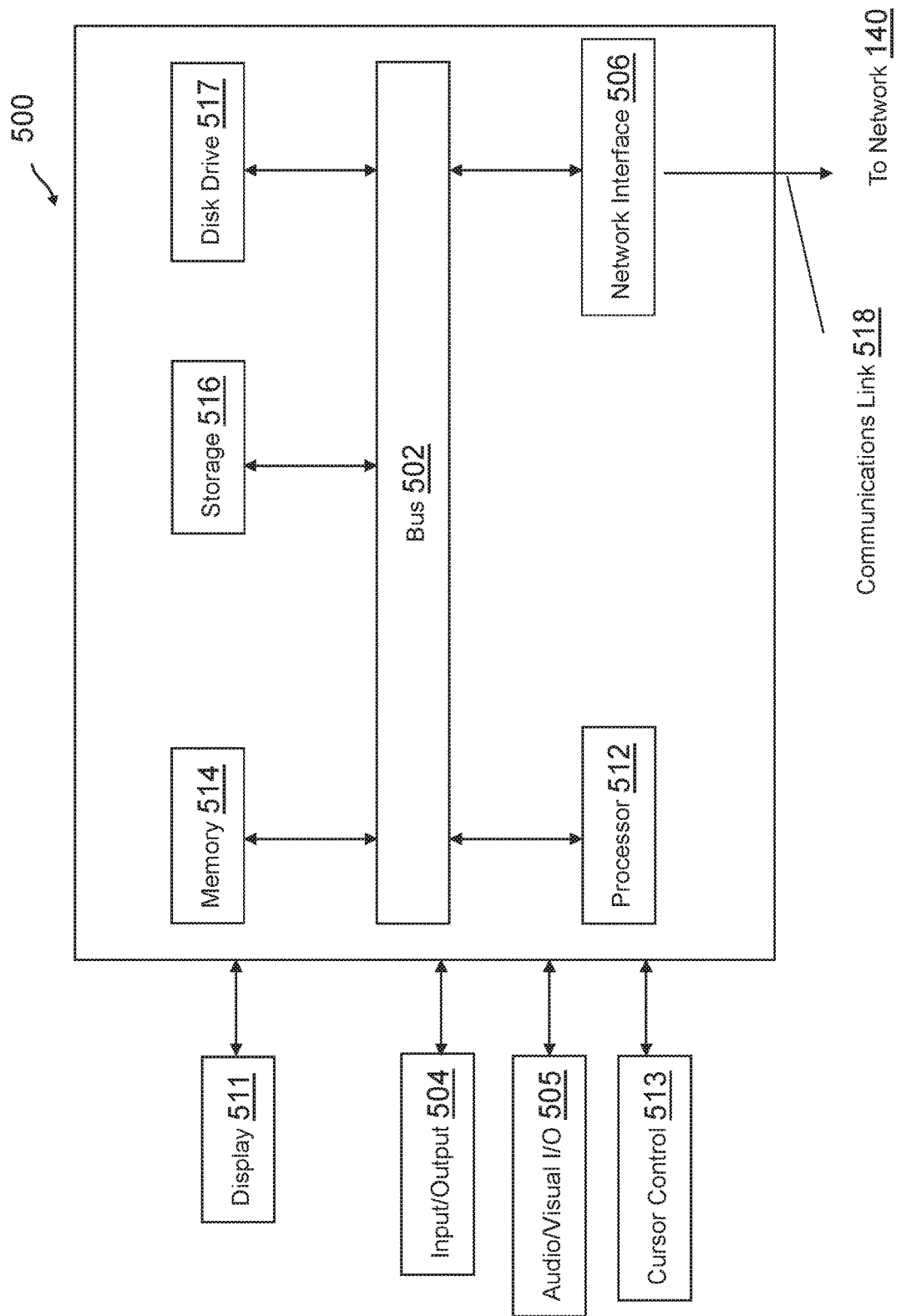
FIG. 5 is a block diagram of a computer system suitable for implementing one or more components in FIG. 1, according to an embodiment.

FIG. 5 is a block diagram of a computer system 500 suitable for implementing one or more components in FIG. 1, according to an embodiment. In various embodiments, the communication device may comprise a personal computing device e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio/visual input/output (I/O) component 505 may also be included to allow a user to use voice for inputting information by converting audio signals. Audio/visual I/O component 505 may allow the user to hear audio. A transceiver or network interface 506 transmits and receives signals between computer system 500 and other devices, such as another communication device, service device, or a service provider server via network 140. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory; and
one or more hardware processors coupled to the non-transitory memory and configured to read instructions from the non-transitory memory to cause the system to perform operations comprising:
identifying personally identifiable information from within an electronic communication, wherein the personally identifiable information is required to be converted to a plurality of pixel data displayed via a plurality of pixels in the electronic communication;
determining a security level associated with the personally identifiable information and an amount of data in the personally identifiable information;
determining a minimum number of pixels required by the security level to secure the personally identifiable information in the electronic communication while displaying the amount of data in a pixel field in the electronic communication;
generating a first pixel layout comprising a number of pixels to display the personally identifiable information based on the minimum number of pixels, wherein the number of pixels is limited in the first pixel layout based on computing and network resources required to display the personally identifiable information in the first pixel layout;
generating a plurality of pixel data corresponding to the personally identifiable information based on the number of pixels, wherein the plurality of pixel data is accessible via a plurality of web links;
receiving, from a computing device, a request to access the plurality of web links via the pixel field in the electronic communication, wherein each of the plurality of web links uniquely map to one of the plurality of pixels;
in response to receiving the request, determining pixel display data for each of the plurality of pixels; and
causing at least a portion of the plurality of pixels to be displayed according to the pixel display data for the first pixel layout within the electronic communication on the computing device, wherein the plurality of pixels is displayed in the first pixel layout.

2. The system of claim 1, the operations further comprising:
determining device data for the computing device and comprising at least one of an IP address, a MAC address, or a device fingerprint; and
determining to cause another portion of the plurality of pixels to be displayed according to a second pixel layout based on determining that the device data does not correspond to a stored device data.

3. The system of claim 1, wherein the pixel display data comprises an output pixel color for each of the plurality of pixels that causes a display of the first pixel layout corresponding to an image of the personally identifiable information, an image corresponding to an error code, an image corresponding to a status error, or an image corresponding to a fraud alert.

4. The system of claim 3, wherein prior to the determining the pixel display data, the operations further comprise:
   determining device data for the computing device and comprises at least one of an IP address, a MAC address, or a device fingerprint; and
   determining whether to cause the display of the first pixel layout corresponding to the image of the personally identifiable information based on determining whether the device data corresponds to stored device data.

5. The system of claim 3, wherein prior to the determining the pixel display data, the operations further comprise:
   determining an account accessing the electronic communication via the computing device, wherein the account comprises one of an email account, a messaging account, or a social networking account; and
   determining whether to provide the image via the first pixel layout based on the account,
   wherein the determining the pixel display data is further based on the determining whether to provide the image.

6. The system of claim 1, wherein prior to the receiving the request, the operations further comprise:
   assigning the plurality of web links to the plurality of pixels; and
   transmitting the electronic communication to the computing device,
   wherein the first pixel layout is further generated based on a randomization of pixel placements for the plurality of pixels within the first pixel layout, and wherein the determining the pixel display data is further based on the randomization of the pixel placements.

7. The system of claim 1, wherein the pixel display data comprises at least one of alphanumeric text, a symbol, a graphical object, or an animation.

8. The system of claim 1, wherein the causing the each of the plurality of pixels to display the pixel display data comprises returning a pixel display color to the each of the plurality of pixels based on the pixel display data and WebSocket network connections associated with the plurality of web links.

9. The system of claim 1, wherein the request to access the plurality of web links comprises one of opening the electronic communication or requesting a display of the pixel display data within the electronic communication.

10. The system of claim 1, wherein the electronic communication comprises an email having an expiration time for display of the personally identifiable information via the first pixel layout.

11. The system of claim 10, wherein the determining the pixel display data comprises:
    determining that the expiration time has lapsed; and
    determining the pixel display data based on the determining that the expiration time has lapsed, wherein the pixel display data hides the personally identifiable information.

12. A method comprising:
    determining display data for displaying a pixelated image within an arrangement of pixels contained in an email, wherein the determining the display data comprises:
       determining a security level associated with the pixelated image and an amount of data in the pixelated image,
       determining a minimum number of pixels required by the security level to securely display the data of the pixelated image in a field of the email based on the amount of the data, and
       determining a number of pixels to display the pixelated image based on the minimum number of pixels, wherein the determined number of pixels is limited to a maximum based on computing and network resources required to display the data in the field;
    randomizing the arrangement of the pixels within a field of the email based on the display data;
    determining a mapping of the pixels to uniform resource locators (URLs) in hypertext markup language (HTML) code for the email, wherein the mapping uniquely assigns each of the pixels to one of the URLs within the mapping;
    determining pixel presentation data for each of the pixels based on the display data for displaying the pixelated image, wherein the pixel presentation data comprises a pixel output for the each of the pixels that causes the pixelated image to be displayed within the randomized arrangement of the pixels; and
    providing the randomized arrangement of the pixels within the field of the email with the URLs for the pixels in the HTML code for the email.

13. The method of claim 12, wherein the pixel output for the each of the pixels comprises one of a black output, a white output, a color output, or no output.

14. The method of claim 12, further comprising:
    receiving a request to display the pixel presentation data in the email based on an access request for the URLs through the HTML code;
    determining whether to display the pixelated image through the field of the email based on the receiving the request; and
    displaying one of the pixelated image using the pixel presentation data or a security breach message based on the determining whether to display the pixelated image.

15. The method of claim 14, wherein prior to the determining whether to display the pixelated image, the method further comprises:
    analyzing device data for a device that is accessing the email based on authorized devices associated with the email, wherein the device data comprises at least one of a device identifier, a device network address, or a device fingerprint,
    wherein the determining whether to display the pixelated image is further based on the analyzing.

16. The method of claim 15, wherein the analyzing is further based on account data for an account accessing the email and authorized accounts associated with the email, wherein the account data comprises at least one of an account identifier or an account risk flag.

17. The method of claim 14, wherein the security breach message comprises at least one of a notification associated with one of a breach of the email, a sharing of the pixelated image with an unauthorized entity, or a refresh instruction to display the pixelated image in an additional email.

18. The method of claim 12, wherein the pixelated image comprises an expiration parameter for a display of the pixelated image via the field in the email, and wherein the method further comprises:
    determining that the expiration parameter has lapsed; and updating the pixel presentation data to prevent the display of the pixelated image via the field.

19. A non-transitory machine-readable medium having stored thereon machine-readable instructions executable to cause a machine to perform operations comprising:
  providing a pixel arrangement for a digital image in an electronic communication, wherein each pixel within the pixel arrangement is uniquely associated with a virtual path to a pixel display output for the each pixel in code for the electronic communication, and wherein the providing the pixel arrangement comprises:
    determining a security level associated with the digital image and an amount of data in the digital image,
    determining a minimum number of pixels required by the security level to securely display the data of the digital image in the pixel arrangement of the electronic communication based on the amount of the data, and
    determining a number of the pixels to display the digital image based on the minimum number of pixels, wherein the determined number of pixels is limited to a maximum based on computing and network resources required to display the data in the pixel arrangement;
  transmitting the electronic communication to a computing device;
  detecting a viewing of the electronic communication based on a request to access the virtual path for the each pixel in the pixel arrangement; and
  determining whether to display the digital image in the pixel arrangement.

20. The non-transitory machine-readable medium of claim 19, wherein the operations further comprise:
  causing to be displayed, within the pixel arrangement, one of a fraud prevention image within the pixel arrangement or the digital image using the pixel display output for the each pixel.

* * * * *